July 23, 1968 H. C. SCHINDLER 3,394,330

SUPERCONDUCTIVE MAGNET CONSTRUCTION

Filed Jan. 16, 1967

Inventor:
HENRY C. SCHINDLER
By Simon Yaffee
Attorney

United States Patent Office 3,394,330
Patented July 23, 1968

3,394,330
SUPERCONDUCTIVE MAGNET CONSTRUCTION

Henry C. Schindler, East Brunswick, N.J., assignor to Radio Corporation of America, a corporation of Delaware Filed Jan. 16, 1967, Ser. No. 609,416
3 Claims. (Cl. 335—216)

ABSTRACT OF THE DISCLOSURE

In superconductive magnets, the magnetic field within the body of the magnet varies from point to point. Since the current carrying capacity of superconductive material becomes less as the magnetic field to which it is subjected increases, less superconductive material is needed at points in the body of the magnet where the field is lower than at other points, for the superconductive material to carry the rated current of the magnet. A superconductive magnet construction is disclosed in which advantage is taken of these facts to minimize use of superconductor material.

*Background of the invention*

This invention relates to superconductive magnet construction. Superconductive magnets may be made by winding a superconductor of uniform cross section in a helical manner to provide a plurality of serially connected winding layers, the several layers being insulated from each other in a known manner. Since the magnetic field produced by the completed magnet is greatest at the center of the magnet and decreases in intensity in a direction perpendicular to the axis of the magnet to zero at a point within the magnet and then reverses its direction and increases to a second lower maximum value, the superconductor of the innermost layer is subjected to the greatest field and the superconductor layers surrounding the innermost layer are subjected to a field which is less for each successive layer in an outward direction to the zero point and then increases again. The current carrying capacity of the superconductor at which the superconductor becomes normal decreases as the magnetic field to which the superconductor is subjected increases. Therefore, the minimum cross sectional area of superconductor that can be used is determined by the highest field to which the superconductor is to be subjected. Accordingly, the superconductive portion of the cross sectional areas of the conductors comprising the winding layers outside of the innermost layer are unnecessarily thick, wasting a considerable amount of expensive superconductive material. In the prior art, superconductive magnets have been made comprising several layers of windings of conductor having constant or uniform cross sectional area of superconductive material which are not connected in series but are electrically isolated from each other. These several layers are supplied by different current sources which supply more current to outer winding layers than to inner winding layers. These several sources must be unicontrolled in a manner such that each source at all times provides the same percentage of its maximum current as the other sources during the build up of current in the magnet to its rated value. The use of many current sources and a unicontrolling means is expensive.

*Summary of invention*

In accordance with the invention, each of the several layers of the magnet is wound with a conductor having an unvarying cross sectional area of superconductive material along the length thereof. However, the cross sectional area of superconductive material of the conductor used for the several layers varies from layer to layer in such a manner that the current carrying capacity of the conductor in each layer is the same as that for each other layer, although the maximum magnetic field to which the several layers are subjected is different. In this manner, the conductors of the several layers have progressively greater cross sectional area of superconductive material in directions away from the zero point and a substantial amount of superconductive material is saved. A single current source may then be connected across all the layers in series to supply the current necessary to build up the current through the several layers of the superconductive material to its rated value, whereby only one source is necessary and no unicontrol means for several current sources need be provided.

*Brief description of the drawing*

The invention may be better understood upon reading the following description in connection with the accompanying drawing in which.

*Detailed description*

Figures 1, 2, 3, 4:
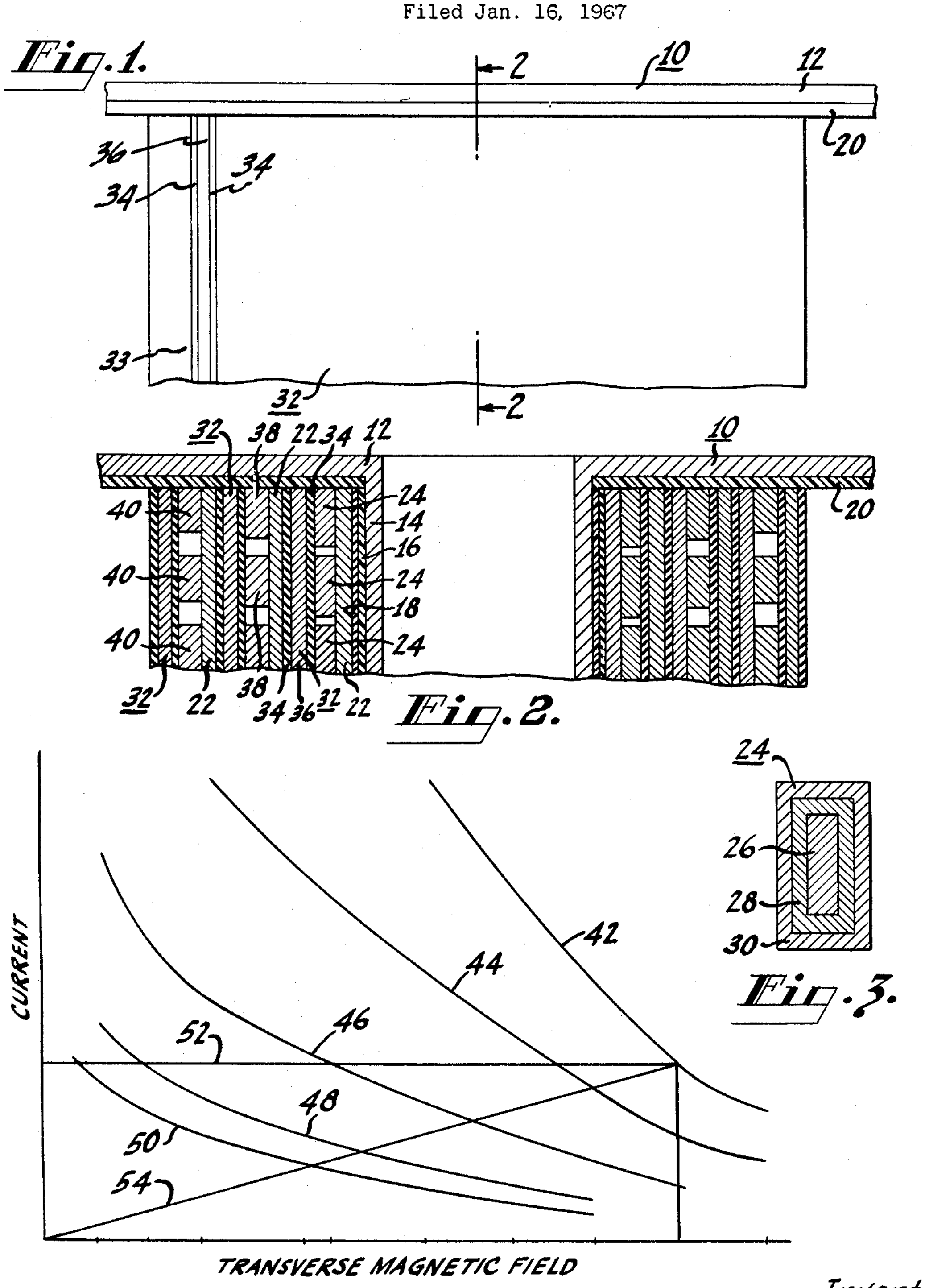
FIGURE 1 is a partial elevational view of a partially completed superconductive magnet embodying the invention.
FIGURE 2 is a section taken along the line 2—2 of FIGURE 1.
FIGURE 3 is a sectional view of a superconductor of a type that may be used in winding the magnet of FIGURES 1 and 2.
FIGURE 4 is a group of curves useful in explaining the invention.

Referring first to FIGURES 1 and 2, a superconductive magnet may be wound on a winding spool 10 having a flange 12 at each end thereof (only one of the flanges 12 being shown) and a center tube 14. This spool 10 may be of any material which is sufficiently physically strong as to act as a core for the superconductive magnet to be wound thereon. The spool 10 is usually made of aluminum or stainless steel. As shown in FIGURE 2, one or more layers of insulation 16 and 18 are placed on the tube 14. Also, a layer of insulation 20 is provided on the inside surface of the flanges 12.

Shorting bars 22 are laid on the insulation 18, these shorting bars being strips of copper or any other good normal conductor that does not have superconducting properties. The shorting bars are laid on the insulation 18 in such a direction that they each contact the turns of a layer of the winding of a superconductor ribbon or conductor, to be described, in several places. As illustrated, the shorting bars 22 are laid on the insulation 18 in a direction parallel to the axis of the spool 10. The number and cross sectional area of the bars 22 are chosen in a known manner so as to provide an alternate path for the current in a portion of a conductor when that portion of the conductor has gone normal, until that portion of the conductor becomes superconductive again, thereby increasing the stability of the magnet. Yet, the cross sectional area of the bars must not be so great that they increase the time constant, that is the time it takes to build up the current in the superconductive magnet to its rated value, to an excessively long period of time. A superconductive ribbon or conductor 24 is carefully wound in a helical manner from one end of the spool 10 to the other end thereof over the bars 22. The conductor 24 is wound with a uniform tension and in such a manner as to provide a uniform distance between the adjacent edges of the turns. A connection (not shown) is made to one end of the superconductive ribbon 24, this connection extending out of the superconductive magnet beyond the flange 12. The ribbon or conductor 24 may comprise a stainless steel substrate 26 as shown in FIGURE 3, a layer of superconductive material 28 such as niobium stannide on the substrate 26 and a layer 30 of normal conductor such as silver on the superconductive layer 28.

When a complete one-conductor thick winding layer has been wound on the bars 22, a composite interlayer sheet 32 is next wound around the completed layer. The interlayer sheet 32 comprises an insulating film 34, a sheet of conductor 36 which remains normal at cryogenic temperatures, such as copper, and another insulating film 34. The interlayer sheet 32 extends for more than 360° whereby the end portions thereof overlap. However, the conducting sheet 36 does not provide a short circuited turn due to the fact that the overlapping portions of the sheet 36 are insulated from each other by the insulating films 34. The overlap is not shown in FIGURE 2. The interlayer sheet 32 also acts in a known manner to make the superconductive magnet more stable, that is to reduce the tendency of the magnet to become normal during build up of the field therein to its rated value.

More shorting bars 22 are positioned on the composite interlayer sheet 32 and another layer of superconductive ribbon 38 is wound in a helical manner on the sheet 32. The superconductive ribbon 38 comprises a conductor of less cross sectional area of superconductive material for a purpose to be explained. This is indicated diagrammatically in FIGURE 2 by showing the ribbon 38 as being smaller in its width direction than the ribbon 24. Then, another composite interlayer sheet 32 is laid in an overlapping manner on the winding layer comprising the layer 38. Then a third layer of superconductive ribbon 40 is wound in a helical manner on the last mentioned sheet 32, the ribbon 40 having a less cross sectional area of superconductive material than the ribbon 38. A third interlayer sheet 32 is laid in an overlapping manner on the winding layer comprising the ribbon 38, the several steps being repeated until the magnet is completely wound. As is understood, further winding layers which are positioned where the magnetic field increases may be wound of conductors having greater cross sectional area of superconductor. Current and metering connections are made to the superconductive ribbon where necessary in a known manner. Each of the windings comprising the conductors 24, 38 and 40 are connected in series. While as noted above, the overlapping of the several interlayer sheets is not shown in FIGURE 2, the overlapping of the outside sheet 32, shown in FIGURE 1, is indicated by the reference numeral 33. Furthermore, no attempt has been made to show the described superconductive magnet or any portion thereof to scale in the drawing.

In explaining the invention, reference may be had to FIGURE 4 which is a plot of the critical current flowing through the superconductive layer of the conductors having various cross sectional areas of superconductive material, plotted against the magnetic field to which the superconductor is subjected. The curves 42, 44, 46, 48 and 50 are plotted for respective conductors having successively less cross sectional area of superconductive material. Each of the curves 42 to 50 indicates the value of the magnetic field above which a corresponding conductor is normal, that it has no superconductive properties. It is noted that the ribbons corresponding respectively to the curves 42, 44, 46 and 48 will carry the current indicated by a rated current line 52 and remain superconductive as long as they are subjected to magnetic fields that are equal to or less than the magnetic field indicated by the point of crossing of each of the curves 42 to 50 and the curve 52. Conductors exhibiting such varying critical current critical field curves may be provided by choosing the cross sectional area of the superconductive layer 28 on the substrate 26, or by changing the current carrying capacity of the layer 28 during manufacture as by adjustment of the process of depositing the layer 28 on the substrate 26 or by heat treatment of the ribbon 24.

In a superconductive magnet of the type described, the innermost winding comprising the conductor 24 is subjected to the maximum magnetic field and each successive layer counting from the inner layer outward is subjected to a magnetic field of less intensity to the zero point and then the field increases in the reverse direction for further successive layers. However, in a superconductive magnet in which all of the layers of the winding are connected in series, the conductors comprising all the windings will carry the same current. Therefore, the innermost winding layers must be wound with a conductor having a sufficiently high critical current at the magnetic field to which it is subjected so that the conductor comprising the innermost layer will not go normal when this layer is carrying its rated current. If all the layers of windings of a superconductive magnet were wound with a conductor that is required for the inner layer, the conductors in the outer winding layers will have greater than necessary cross sectional areas of superconductive material, whereby much superconductive material would be wasted. Thus, much superconductive material can be saved by choosing, for each outer layer of the superconductive magnet, a conductor having less cross sectional area of superconductive material. However, all the conductors must be chosen to have sufficient cross sectional area of superconductive material so that, at the field to which they are subjected, the conductors can carry the rated current of the magnet without going normal. Turning again to FIGURE 2, the several conductors 24, 38 and 40 (and other conductors in outer layers not shown) are chosen to have current carrying capacities which are as great as the rated current 52 for the completed superconductive magnet at the magnetic fields to which the several conductors 24, 38 and 40 may be subjected. Therefore, when the current in the magnet is built up along the liner 54, to, but not beyond, the critical value of the conductor 24 of the innermost winding layer, no conductors 24, 38 or 40 will become normal and yet much valuable superconductive material will be saved. The saving in material and accessory electrical equipment in one practical case amounted to about 25% of the cost of the completed magnet. Furthermore, it is easier to operate the described system than to operate a magnet system using a plurality of different unicontrolled sources.

While only one embodiment of the improved superconductive magnet has been described, modifications thereof will suggest themselves to a person skilled in the art. For example, the conductors 34, 38 and 40 may be of any cross sectional form other than the ribbon-like form disclosed such as of round cross section, and may include a substrate 26 or not as desired, provided only that the current carrying capacity of the conductor is sufficiently great at the magnetic field to which they will be subjected. The several winding layers may have the same or a different number of turns. It may be convenient to wind several adjacent layers with conductors of the same cross sectional area of superconductive material instead of using different conductors having different areas of superconductive materials for each winding layer. Also, a spool 10 having no flange 12 may be used. Only one layer of insulation 16 or 18 may be necessary on the tube 14 or, if an insulating spool is used no insulation on the spool itself may be necessary. Therefore, this description is to be considered as illustrative and not in a limiting sense.

What is claimed is:

1. A superconductive magnet having a plurality of helically wound layers of conductors, said layers being coaxially arranged, the conductors comprising said layers being connected in series whereby substantially the same amount of current flows through the conductors comprising the separate layers, the outer layers being subjected to less magnetic field than the innermost layer, a layer subjected to a lesser magnetic field having smaller cross sectional area of superconductive material than each layer subjected to a greater magnetic field, each layer comprising a conductor having sufficient cross sectional area of superconductive material to carry the rated value of current of the magnet in the magnetic field to which said layers are subjected without becoming normal.

2. The invention as expressed in claim 1 in which said superconductive material is a superconductive compound.

3. The invention as expressed in claim 1 in which said superconductive material is niobium stannide.

References Cited

UNITED STATES PATENTS

| | | | |
|---|---|---|---|
| 3,129,359 | 4/1964 | Kunzler | 335—216 X |
| 3,185,900 | 5/1965 | Jaccarino et al. | 335—216 |

OTHER REFERENCES

"Superconducting Magnets," an article in International Science & Technology, by Hulm et al., May 1963, pp. 50–57.

BERNARD A. GILHEANY, *Primary Examiner.*

GEORGE HARRIS, *Assistant Examiner.*